United States Patent [19]

Schwab

[11] Patent Number: 4,688,046

[45] Date of Patent: Aug. 18, 1987

[54] ADF BEARING AND LOCATION FOR USE WITH ASR AND ASDE DISPLAYS

[75] Inventor: Carl E. Schwab, Huntington Station, N.Y.

[73] Assignee: ISC Cardion Electronics, Inc., Woodbury, N.Y.

[21] Appl. No.: 417,251

[22] Filed: Sep. 13, 1982

[51] Int. Cl.$^4$ ............................................. G01S 3/02
[52] U.S. Cl. .................................. 342/456; 342/463; 342/465; 342/185
[58] Field of Search ............... 343/5 LS, 5 GC, 5 SC, 343/6 TV, 456, 454, 463, 464, 465, 450, 453, 455, 6.5 R; 342/456, 454, 463, 464, 465, 450, 453, 455, 33, 36, 176, 182, 183

[56] References Cited

U.S. PATENT DOCUMENTS

| | | | |
|---|---|---|---|
| 3,015,098 | 12/1961 | Jolliffe et al. | 343/465 |
| 3,047,861 | 7/1962 | Arnold et al. | 343/456 |
| 3,068,473 | 12/1962 | Muth | 343/465 |
| 3,114,912 | 12/1963 | Tooley | 343/456 |
| 3,665,464 | 5/1972 | Meilander | 343/456 X |
| 3,668,403 | 6/1972 | Meilander | 343/456 X |
| 3,793,635 | 2/1974 | Potter | 343/463 |
| 3,949,399 | 4/1976 | Huber et al. | 343/456 X |
| 4,215,345 | 7/1980 | MacDoran | 343/465 |
| 4,274,096 | 6/1981 | Dennison | 343/456 |
| 4,281,327 | 7/1981 | Frazier et al. | 343/15 X |
| 4,319,243 | 3/1982 | Vachenaur et al. | 343/454 X |
| 4,383,258 | 5/1983 | Morin | 343/5 SC |
| 4,418,349 | 11/1983 | Höfgen et al. | 343/6.5 R |
| 4,443,797 | 4/1984 | Cramp et al. | 343/5 CD X |

Primary Examiner—Theodore M. Blum
Assistant Examiner—John B. Sotomayor
Attorney, Agent, or Firm—Pollock, Vande Sande & Priddy

[57] ABSTRACT

An aircraft locating system identifies on a TV format radar display the position of a specific aircraft based on an RF transmission from the aircraft on an RF channel. The locating system includes at least a pair of receive stations located within several miles of an airport and separated by a base line which is in near proximity to at least one runway at the airport or a theoretical extension thereof. Each receive station includes a passive receiver for determining a bearing angle to a source of RF on the RF channel for generating a signal representative of the bearing angle.

The locating system further includes a processor which is responsive to bearing angle signals derived from the receive stations for generating line count and line delay information. The line count and line delay information correlate a position determined by the bearing angle signals from at least a pair of receive stations with a frame of reference of the TV display.

The system further includes a video mixer which responds to two different input signals. A first input signal to the video mixer is a scan converted radar return signal. The second input signal to the video mixer is the line count and line delay information. The output of the video mixer is used to drive a video display. The video display, subjected to the two identified inputs can highlight a location identified by the line count and line delay information so that for example a person viewing the display would be able to identify which of perhaps plural radar returns shown on the display is associated with an aircraft which is actively transmitting on the RF channel.

14 Claims, 12 Drawing Figures

FIG. 6A
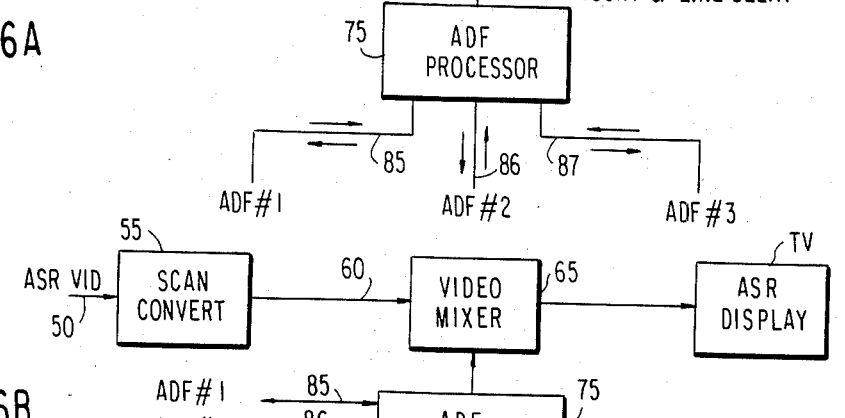
FIG. 6B
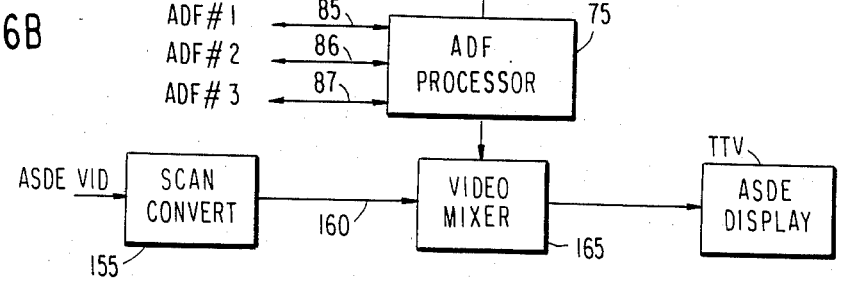
FIG. 7
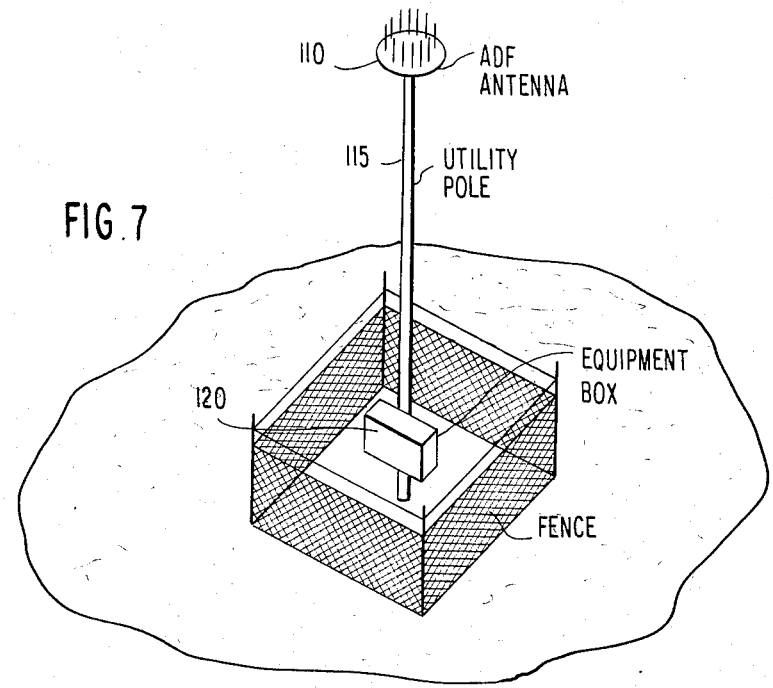

ADF PROCESSOR

BASIC ÷N PLL

BLOCK DIAGRAM
ADF

ADF BEARING AND LOCATION FOR USE WITH ASR AND ASDE DISPLAYS

DESCRIPTION

1. Technical Field

The invention relates to equipment to assist in the air traffic control function. More particularly, the invention enables ready identification of an aircraft (displayed on radar display equipment) with whom a controller is conversing.

2. Background Art

Present day control techniques for use in connection with aircraft moving in the vicinity of an airport include a radar display provided for the benefit of an air traffic controller, depicting the locations of various aircraft within a controlled territory. In addition, pilots and the air traffic controller can converse over a dedicated RF channel. With these instruments, the aircraft controller can, by issuing commands to various pilots, ensure that the aircraft within the territory controlled by him move on safe vectors to and from the airport runways.

Modern equipment used at high traffic locations, and with specially equipped aircraft (usually restricted to passenger-carrying or other commercial craft) provide on the display, in addition to the location of various aircraft within the space monitored by the radar equipment, identification of aircraft and perhaps in addition, altitude information. This enables the air traffic controller to immediately identify or correlate, on the display, the aircraft with which he is communicating at any given time. See, for example Vachenauer et al, U.S. Pat. No. 4,319,243. Unfortunately, many airports do not have this sophisticated equipment and many aircraft are not equipped with the transponders required to perform this function or the transponder may be nonoperational. Accordingly, at many air traffic control locations, the correlation between an aircraft with whom the controller is conversing and the location of that aircraft as shown on the display requires a mental operation by the air traffic controller.

It is an object of the invention to improve airport system capacity during poor visibility conditions and at the same time reduce controller workload and the possibility of error by providing an automatic correlation between an aircraft with whom the controller may be conversing and its indicia on the display. It is another object of the present invention to achieve the foregoing function without requiring dedicated transmitters for this purpose. Systems or equipment which require dedicated transmitters for their function contribute to radio frequency emission pollution. Overcrowding the radio frequency spectrum is a particularly severe problem at air traffic control locations and thus any equipment or system which requires dedicated radio channels can be disadvantageous on this feature alone.

Rather than using another dedicated RF channel, the invention employs as a position indicator, the RF transmissions (sometimes referred to as VHF) which are otherwise required for voice or other communication from the aircraft to the control location. In accordance with one embodiment of the invention, an aircraft locating system for correlating on a TV radar display, aircraft position with information transmitted from the aircraft on a party line RF channel includes at least a pair of ADF stations located within several miles of an airport and separated by a base line which intersects at least one runway at said airport or a theoretical extension of that runway. Each of the ADF stations comprises a passive receiver for determining bearing angle from the station to a source of radio frequency on the RF channel used for communications from the aircraft for other purposes.

Aircraft bearing information is communicated from each of the ADF stations to a common location (for example the controller's location) where by using conventional (triangulation or similar) techniques, a processor responsive to the plural indications of bearing generates information respecting position of the transmitter with respect to the control location. This information is preferably converted to TV format by line count and line delay data using conventional integrated circuit components. The line count and line delay data, indicating aircraft position with respect to the radar origin is then coupled as one input to a video mixer. Another input to the video mixer is the scan converted radar return signal. The output of the video mixer is the linear combination of these two signals, usually non-additive, so as to produce on the display a superimposition thereof. Accordingly, the radar return signal is readily identified, and the line count and line delay data can be used to provide a display of a specialized indicia indicating a transmitting aircraft. The specialized indicia could be, for example, a conventional blinking cursor or other symbol readily identifiable by the air traffic controller. Accordingly, in accordance with the invention, whenever the controller is receiving transmission from one aircraft among a plurality which may be represented on his radar display, he can readily identify the transmitting aircraft by the association on the display of the specialized indicia indicating that such transmission is taking place.

While the brief description of the invention given above presupposes that the passive ADF receivers are tuned to the air traffic control frequency, that is not essential to the invention. Conventional equipment at airports includes ground control equipment including its own ASDE radar sub-system. Controllers and pilots converse, while the aircraft is on the ground, on separate ground control frequency. By tuning the same (on a time shared basis) or other ADF passive receivers to the ground control frequency, the invention can be applied to the ground control of aircraft as well as control of the aircraft in the air.

Using a pair of ADF stations results in the geometric property that the loci of greatest accuracy is a circle whose bisecting diameter passes through the ADF locations. The loci of least accuracy of positional location is the line, including the bisecting diameter, passing through the ADF station locations. The location accuracy of the triangulation operation is a direct function of the cosecant of the interior angle measured at the aircraft between the bearings to each ADF station. The cosecant has a value of infinity at zero and 180° and descends to a value of one at 90°. The location accuracy of the triangulation system can be improved by adding a third ADF station, also tuned to the same frequency as are the other two. The third ADF station is located so that base lines among pairs of ADF stations form an equilateral triangle. Since only two of the three ADF stations are required for operation, use of data from the third station can be used in a number of ways. For one thing, the three pairs of ADF stations (1-2, 1-3 and 2-3) can be used to give three different position estimates. These estimates can be averaged, or can be weighted depending upon known geometrical properties. In addition, the three estimates can be used to anticipate impending failure of one of the stations or the third station can be used as a back-up, available for instant replacement in the event that one of the other two stations fails.

In an effort to improve the air traffic control system the Federal Aviation Administration has indicated that they will be installing and relying on a system identified as Threat Alert Collision and Avoidance System or TCAS. Inherent in TCAS operation is a mode S squitter transmission that can take place whenever the transponder aboard an aircraft is not being interrogated. This squitter transmission carries aircraft identity (plus other data). This squitter transmission is used in embodiments of the invention to augment (or replace) the VHF direction finding and provide identity as well as location. Thus embodiments of the invention employing the TCAS transmission preserve the entirely passive nature of the invention. To implement or augment the invention using TCAS, the ADF stations naturally require a companion receiver tuned to the TCAS transmission.

In another embodiment the TCAS is used in combination with the VHF transmission. The TCAS transmission fits nicely with the characteristics of the ADF voice frequency operation. By recording time of arrival (TOA) information at the receiving stations, we can increase positional accuracy along the ADF's loci of least accuracy. The TOA ranging technique has greatest positioning accuracy along the same line. The TOA ranging technique is based on measuring the absolute time and the relative time difference of some time reference feature of the received waveform. Such a time reference feature implies a wider bandwidth signal and a convenient form is a pulse modulated waveform such as the mode S squitter response from the TCAS-I or TCAS-II. A full TOA technique implies an extremely accurate clock at each of the receive locations and at the source (TCAS aircraft located transmitter) to accurately determine range. For example, a range accuracy of ±30 meters requires clock stability approximating $10^{-12}$ per day. This is beyond present day commercial low cost crystal technology. However, partial TOA techniques, using the time difference at separated receive locations, produces lines of position. The time difference loci for constant differences are hyperbolas with the receive locations forming the foci. The eccentricity, e, of these hyperbolas varies from one to infinity and is a function of Δt or the time difference. We can write:

$$e = D/(\Delta t * 300),$$

where

Δt = the time difference in microseconds, and

D = separation of the receive station in meters.

Using this embodiment of the invention, the ADF receivers, using direction finding techniques, accurately locate the aircraft around the loci of greatest accuracy and accurately locate in the transverse direction along the loci of least accuracy. The TCAS receivers, in time difference processing achieves best accuracy along the loci of least accuracy so that overall just two receiving stations provide very good positional location accuracy over the entire circular area between two receive stations. An inherent advantage of combining direction finding and differential TOA techniques is a degree of redundancy that allows accuracy improvement by statistical processing and provides a higher level of system reliability.

Accordingly, in this embodiment of the invention, each of the receive stations (previously referred to as ADF stations) includes in addition to the voice frequency (VF) receiver typically operating at VHF, a TCAS receiver and a time base. The time base can be controlled by the processor at the central or controlling location. Registers at each of the stations record TOA of a squitter transmission along with the rest of the data included in the transmission. The information is then combined; the combination can weight the information based on quality. A communication facility transmits the time of arrival and TCAS signal to the central location. The processing means at the central location can then identify a hyperbolic location line for the aircraft using the TCAS transmission, and a position using the VHF transmission. A simple statistical quality is received signal strength, i.e. weight more heavily those signals with greater strength. Monitoring received signal level on a per reply basis does this.

The brief description of two embodiments of the invention foreshadows other embodiments. For instance in a third embodiment the VHF signal is no longer relied on, instead only the TCAS transmission is processed with the previously described triangulation techniques.

A fourth embodiment augments the third embodiment by relying on TOA of VHF transmission to generate hyperbolas of position to refine the position estimate based on TCAS triangulation.

BRIEF DESCRIPTION OF THE DRAWINGS

The present invention will now be further described in the following portions of this specification when taken in conjunction with the attached drawings so as to enable those skilled in the art to practice the invention; in the drawings, like reference characters identify identical apparatus and:

FIG. 6A is a block diagram of the apparatus located at or near the control tower in accordance with the present invention;

FIG. 6B is a block diagram of the equipment located at or near the control tower in a different embodiment of the invention;

FIG. 7 illustrates the equipment located at a typical receive station;

DETAILED DESCRIPTION OF PREFERRED EMBODIMENTS

Before describing preferred embodiments of the invention, the problem sought to be solved will briefly be described. The problem is particularly acute at airports of small size that carry out significant commuter and private aircraft operations. Loosely put, these facilities achieve 100,000 or more operations per year. The control towers at these facilities are concerned with air traffic out to five miles and up to 3000 feet. To assist in the air traffic control function at these locations, the FAA has provided (or will in the future provide) a relayed, repeated ASR (Airport Surveillance Radar or terminal radar) display to help, particularly during night time and periods of poor visibility. The airport control tower personnel have no control of assigned SSR (secondary surveillance radar) codes in this relayed system. Thus, in operation the association of aircraft in communication and the display of the radar return is a mental process that airport personnel must perform. The invention provides, through the use of automatic direction finding techniques, a coordinated display so that a symbol is generated in a superimposed fashion over or near the display of the responding aircraft's radar return. This contributes to safety because it reduces the mental strain that occurs during stressful conditions associated with bad weather and/or poor visibility conditions. It should be understood that the present invention is superimposed on this relayed, repeated ASR return, and uses other aircraft transmissions, e.g., VHF, TCAS, etc. For example the conventional VHF communications (or that communication plus the TCAS transmission) carried out between air tower personnel and pilots in the vicinity of the control tower can be used. That VHF operation is typically party line and simplex in this control tower/air traffic situation. Desirably, the invention provides simple detection apparatus, low cost communication links, is inherently fail-safe to improve safety, reduce human error, reduce control tower personnel workload, etc.

Figure 1:
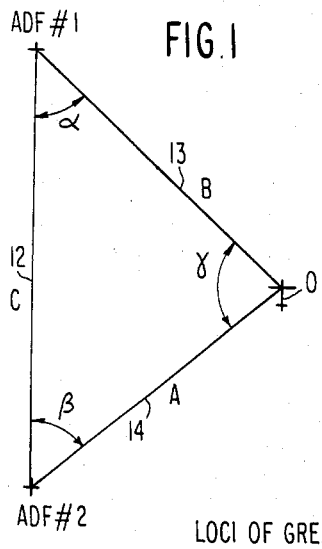
FIG. 1 illustrates the geometrical distribution of receive stations ADF #1 and ADF #2 locating the position of an aircraft O.

FIG. 1 shows schematically two ADF locations, particularly ADF #1 and ADF #2. These stations are separated along a base line by a distance C. Illustratively shown in FIG. 1 is an aircraft O. In order to determine the aircraft's position relative to any point fixed with respect to the stations, the distances A and B must be determined. The equation determining these distances is the law of sines or:

$$A/\sine \alpha = B/\sine \beta = C/\sine \gamma.$$

The value of C is known and the values of $\alpha$ and $\beta$ are measured by the respective ADF stations. $\gamma$ is of course the difference between the sum of $\alpha$ and $\beta$ and 180°.

Based on the foregoing, then, the position of the aircraft O can be stated in terms of range and bearing from either station or range and bearing from any other point fixed relative to either of the stations.

Figure 2:
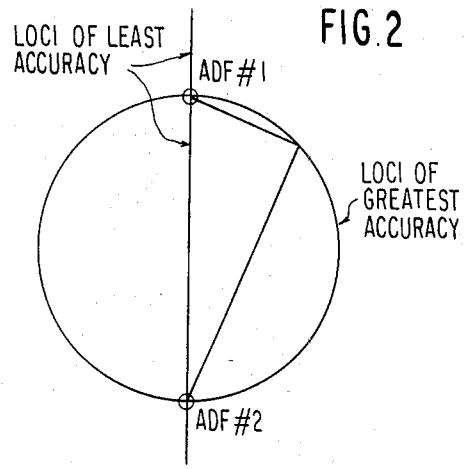
FIG. 2 is a similar diagram identifying the loci of greatest accuracy and the loci of least accuracy with respect to the same two receive stations.

It is a relatively simple geometric property that the loci of greatest accuracy for the position determining geometry of FIG. 1 is a circle whose bisecting diameter is the base line 12. The loci of least accuracy of positional location is the line including the bisecting diameter passing through the stations. The accuracy of location is a direct function of cosecant Y. FIG. 2 shows both the loci of greatest accuracy and the loci of least accuracy in relation to the location of the ADF stations.

Figure 3:
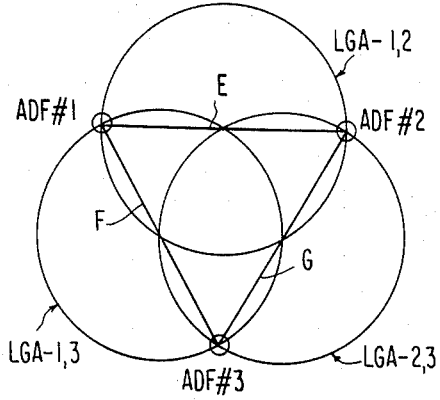
FIG. 3 illustrates the geometry which is produced by the use of three different spaced receive stations ADF #1-3, illustrating a loci of greatest accuracy for each pair.

FIG. 3 shows three ADF stations. Each pair of ADF stations has a different loci of greatest accuracy (LGA). The three pairs of ADF stations thus have LGA-1,2; LGA-1,3 and LGA-2,3; all as represented in FIG. 3. For example, the three ADF stations are located so that the base lines E, F and G formed between different pairs of ADF stations, form an equilateral triangle. In connection with aircraft operations, then, preferably the airport would lie within the equilateral triangle E-F-G.

The tangential location accuracy is $\pm \Delta D = R * \sin(\pm \Delta \alpha)$ where $\Delta D$ is the tangential displacement error, R is the range to the target, and $\Delta \alpha$ is the angular error. For example, if the bearing accuracy error is $\pm 2°$, and R equals 5 miles; $\pm \Delta D = \pm 0.174$ miles or $\pm 921$ feet. The error of location distribution is approximated by a Gaussian function wherein the tangential location accuracy can be equated to $\pm 3 \sigma$; therefore the RMS becomes $\pm 921/3$ or $\pm 307$ feet.

Accordingly, the two or three ADF stations can locate the aircraft position. To effectively use this information, we do not want to provide this information on another display. Rather, we want to integrate this into a display that the personnel is already using.

Furthermore, to avoid increasing radio frequency pollution, the ADF stations are tuned to an aircraft transmission that is already present. That radio frequency transmission can be either the approach frequency, the ground control frequency or other pre-existing aircraft transmission, as is described below.

The traditional radar display has been the plan position indicator (PPI). When this display is introduced into the controller environment, and particularly into the control tower environment, the display is put into TV raster format, i.e. by scan conversion. Three advantages accrue: higher brightness, lower cost display with simple paralleling of additional displays and low cost remoting. The TV format makes it easy for the insertion of symbols indicating location of the transmitting source in a superimposed manner. This accomplishes the first and second objectives because associating transmitting aircraft and display location is instantaneous with reduced mental effort, and this reduced mental effort decreases the probability of human error.

While this discussion has been in connection with the terminal radar application, it can also be applied to airport surface detection equipment (ASDE) to help identify the aircraft on taxiways during poor visibility conditions. This a non-conflicting application since approach control and ground control use two different radio frequencies, and two different controllers monitor two different displays.

Figure 5:
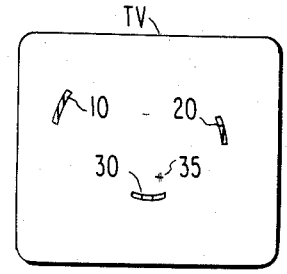
FIG. 5 illustrates a typical display produced by the use of the invention illustrating aircraft position and locating a particular aircraft by reason of its RF transmission.
Figure 4:
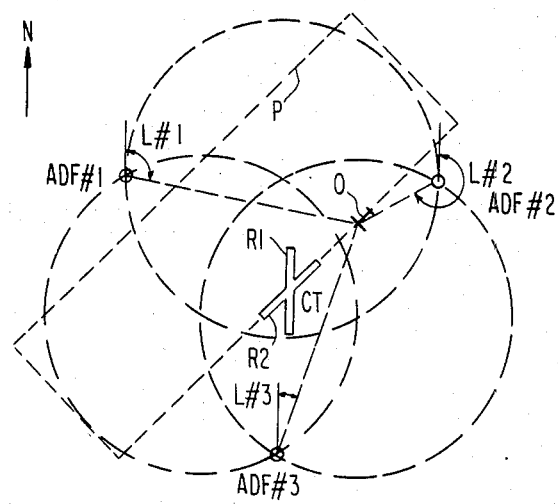
FIG. 4 superimposes on FIG. 3 the location of an airport, showing a typical aircraft O and the approach and departure path P.

FIG. 4 illustrates a typical airport including runways R1 and R2, and located nearby a control tower CT. The ADF stations are shown in FIG. 4 positioned relative to the airport runways R1 and R2 as well as the approach and departure paths P (shown in dashed line). The radar repeated display and associated processing equipment (described hereinafter) are located at the control tower CT. FIG. 5 illustrates a typical display identified by the reference characters TV. The display TV, as shown in FIG. 5, illustrates radar return signals 10, 20 and 30. The symbols 10, 20 and 30 may be arbitrary in shape, and those skilled in the art will be aware that other symbols could be used instead. The ADF information, after processing, provides an additional symbol 35 on the display TV. This additional symbol 35 is located adjacent one of the radar return signals in a distinctive manner to indicate to the operator viewing the display TV the return from the aircraft with which he is engaged in conversation.

FIG. 6A is a block diagram of the equipment included at the control tower CT to effect the foregoing function. As shown in FIG. 6, an ASR video signal is coupled via a link 50 to a PPI to TV scan converter 55. The output of the scan converter 55 is the radar return video in a TV format, which is coupled via a link 60 to a video mixer 65. The output of the video mixer 65 drives the display TV. The other input to the video mixer 65 is provided by the ADF processor 75. Input to the ADF processor 75 is bearing information from the ADF stations #1–#3. This information travels to the ADF processor 75 over communication links 85–87. For example, communication links 85–87 may comprise standard telephone lines, twisted pair, coaxial cable, fiber-optics or the like. These same communication links 85–87 can be used to send frequency selection (and other information) if necessary to the ADF sites.

The information passed from the ADF processor 75 to the video mixer 65 is a TV line count, and a TV line delay. This information identifies the particular TV line (vertical distance from the top of the display TV to the line on which the symbol 35 is to be located) and line delay (delay from the start of the scan of the line identified by the TV line count data, to the horizontal position at which the symbol 35 is to appear). While the symbol 35 can be represented as lying on a single TV line, at a single horizontal pixel position, those skilled in the art will be aware that the actual symbol, as produced on the display TV (see FIG. 5) is present on a number of horizontally disposed scan lines and exists for one or more pixels per line so as to make the symbol 35 readily visible to an operator.

Referring briefly to FIG. 4, it should be apparent that for good base line separation, the different ADF's are separated by a few miles.

FIG. 7 schematically illustrates the equipment located at each of the ADF stations. That equipment includes an ADF antenna 110 supported on a pole 115. The receiving equipment at each ADF station is located in an equipment container 120. The communication link from the equipment container 120 to the ADF processor 75 is not shown in FIG. 7.

Figure 8:
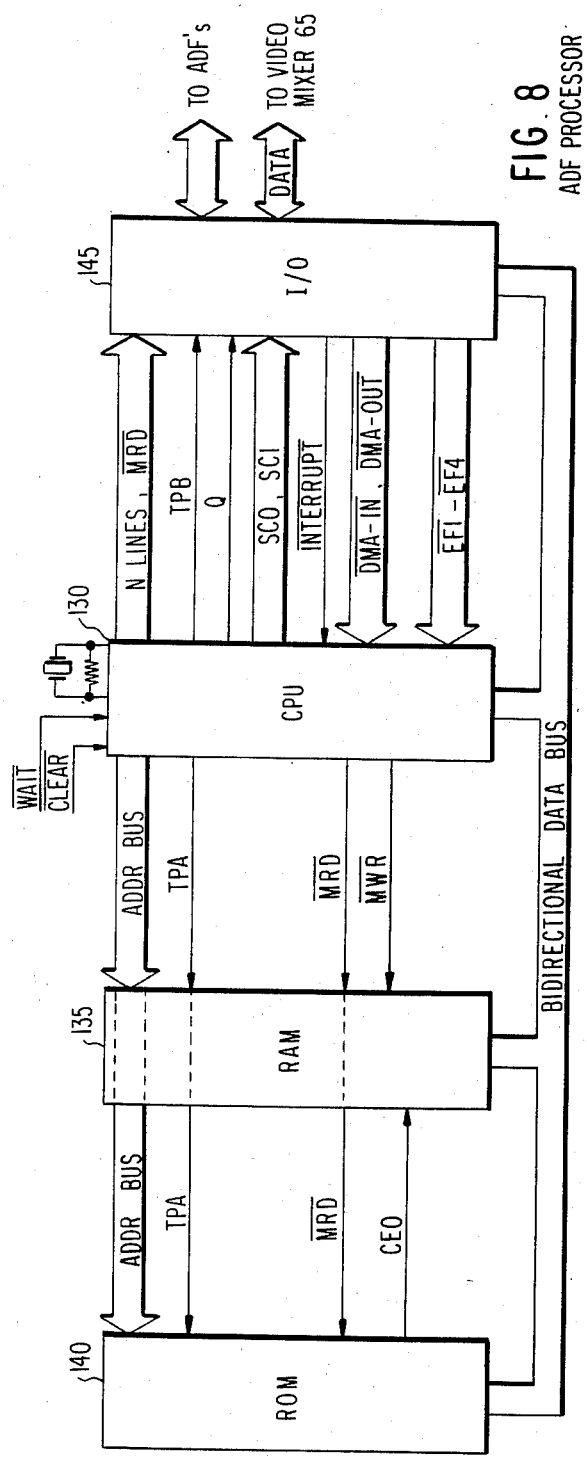
FIG. 8 is a detailed block diagram of the ADF processor of FIG. 6A or 6B.

FIG. 8 is a block diagram of that portion of the ADF processor 75 which responds to bearing information from the various ADF's, and generates line count and line delay information for input to the video mixer 65. More particularly, as shown in FIG. 8, the ADF processor 75 includes a CPU 130 (i.e. a microprocessor) coupled to read/write memory 135, read only memory 140 and an I/O port 145. Program algorithms are stored in the read only memory 140, data dependent storage is provided by the random access memory 135, and logical and arithmetic operations are performed by CPU 130. Information is accepted from and transmitted to the outside world via the I/O port 145.

It should be apparent to those skilled in the art that the equipment located at each ADF station 120 could provide for digital transmission to the I/O port 145. On the other hand, the signal transmission could be analog, with one of the tasks of the CPU 130 to sample and digitize the analog information. Depending on the particular frequency to which the ADF receiver 120 is tuned, the apparatus shown in FIGS. 4–8 could provide for ASR or ASDE displays, the former when tuned to approach control frequency and the latter when tuned to ground control frequency.

Although the operation of embodiments of the invention described so far should be apparent, a brief description will be given here. In its simplest form, each ADF receiver is fixedly tuned (to either a ground control, approach control frequency or some other aircraft transmitter frequency, e.g., TCAS). The ADF station couples to the I/O port 145 information (in either analog or digital form) identifying the bearing angle of the aircraft's transmission with respect to the transmitting station. The processor 130 accepts this information from the I/O port 145 and stores it as a function of time of receipt. When information has been received from all ADF's, or at least a pair of ADF's, the processor 130 processes the information along with information respecting the relative locations of the ADF stations and the control tower. The result of the processing is bearing and distance information from the control tower to the transmitting aircraft. This information is then converted to line count and line delay and passed to the video mixer 65 via the I/O port 145. If more than a pair of ADF stations are provided and operating simultaneously, the processor 130 can separately determine aircraft bearing and position from each pair of ADF replies. The microprocessor 130 can, thereafter, average or otherwise mathematically combine the results produced by the previous processing and then translate the combined or averaged range and bearing to line count and line delay information for display on TV.

On the other hand, FIG. 6B illustrates an embodiment of the invention providing for the creation of two displays, an ASR display TV and an ASDE display TTV. The upper rail of FIG. 6B is identical to FIG. 6A, and shows the ASR video being converted to TV format, and mixed in a mixer 65 with ADF processor information respecting line count and line delay, whereafter the resulting superposed signals are displayed on the display TV. Since, in this case, the ADF information used to determine range and bearing is derived from ADF receivers tuned to an approach control frequency (or to TCAS), the display TV illustrates the location of flying aircraft and identifies a transmitting aircraft in flight. On the other hand, the lower rail of FIG. 6B illustrates a similar signal processing chain used for taxiing aircraft. More particularly, in this case ASDE video is input to a scan converter 155 where it is scan converted in format and coupled over a link 160 to a video mixer 165. The video mixer 165 is also subject to line count and line delay information from the ADF processor 75 whereafter the superposed signals are displayed on the ASDE display TTV. In one embodiment of the invention illustrated in block diagram form in FIG. 6B, each ADF station includes one receiver tuned to approach control frequency (or TCAS) and a second receiver tuned to ground control frequency. The ADF processor 75 couples line count and line delay information respecting approach control frequency to the video mixer 65 whereas line count and line delay information respecting ground control frequency information is coupled to the video mixer 165.

At airport locations having low traffic density, another embodiment of the invention is possible with only a single receiver at each station. In this mode one ADF is tuned to approach control frequency while another is tuned to ground control. When either detect a transmission this information is passed to the microprocessor 130, which retunes the remaining ADF(s) to the correct frequency. Since this retuning operation is under control of the microprocessor 130, it can simply pass information derived during the time that the receivers are tuned to approach control frequency to the mixer 65 and pass information derived when the ADF receiver is tuned to ground control frequency, to the video mixer 165. Thus, in effect the ADF processor 75 and the ADF receivers themselves are multiplexed between the ground control frequency and approach control frequency.

TCAS

With the recent announcement that the Threat Alert and Collision Avoidance System (TCAS) is to be implemented, integration of the TCAS transmissions for position location produces unexpected advantages.

Figure 9:
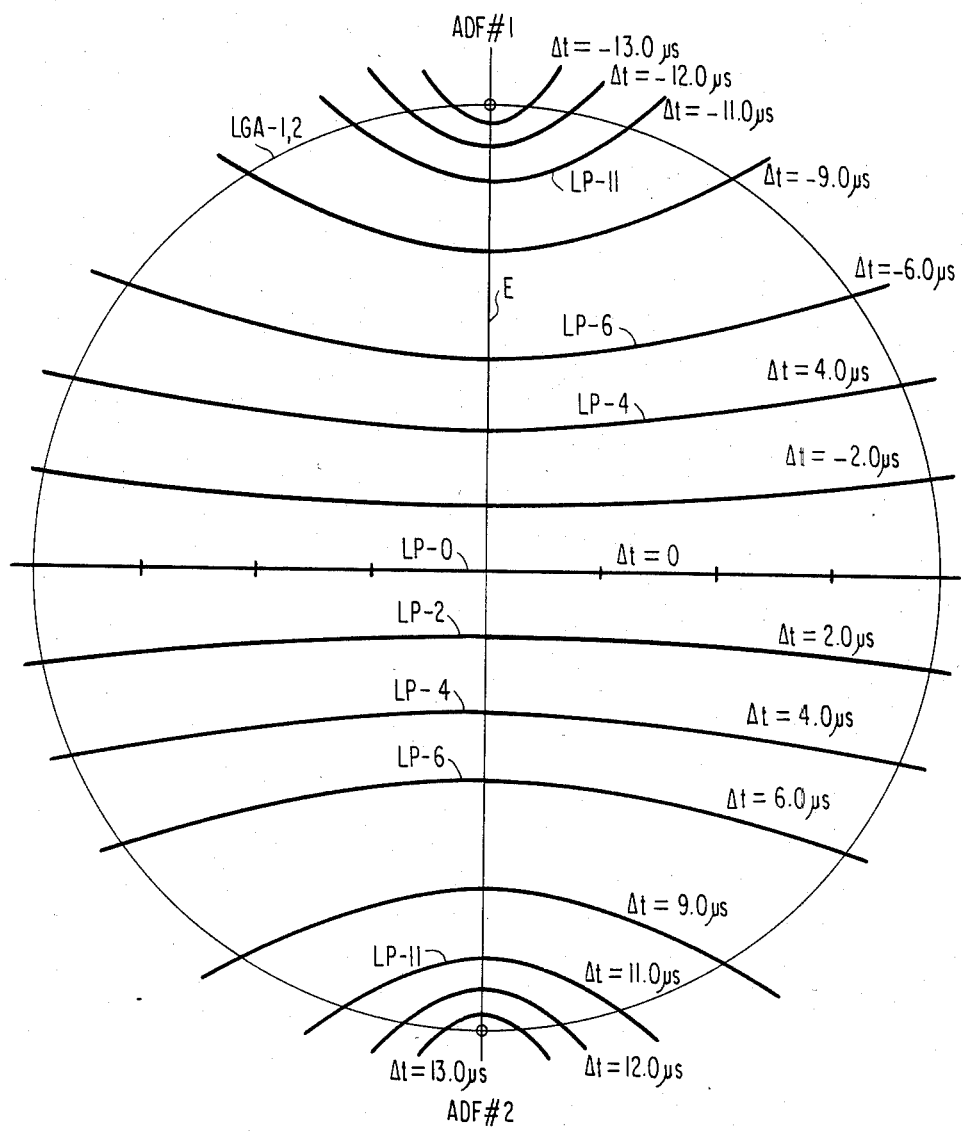
FIG. 9 superimposes on a drawing illustrating a pair of receive stations and the associated loci of greatest accuracy, the hyperbolic position lines produced by measuring relative time of arrive of RF transmissions.

The TCAS system provides a transponder upon an aircraft which transmits on an RF channel different from either the ground or approach control channel under one of two circumstances. A transmission is provided in response to an interrogation command, or a transmission is provided in a squitter mode when the TCAS aircraft carried equipment has not been interrogated for a preset period of time. The purpose of the squitter mode is to alert other TCAS units within the receiving area, of its presence. However, apparatus can be provided to use the squitter transmission to locate the TCAS unit and the aircraft carrying the same. To maintain the passive nature of the invention, we use a passive ranging technique based on time of arrival (TOA). The ADF function can be done using TCAS or the previously described VF transmission or both. FIG. 9 illustrates two ADF stations using TOA ranging to locate an aircraft transmitting in the vicinity of the ADF stations. TOA can be applied to measure absolute time of arrival (full TOA) of some reference feature of the transmitted waveform. Such a time reference feature implies a wider bandwidth signal in a convenient form such a pulse modulated waveform, similar to the mode S squitter response from TCAS-I or TCAS-II. A full TOA technique implies an extremely accurate clock at each receive location and the source (TCAS transmitter) to achieve range position. For example, a range accuracy of ±30 meters requires clock stability approximating $10^{-12}$ per day and is beyond commercial low cost crystal technology.

Valuable data can be derived in a partial TOA technique without requiring the previously cited high clock accuracy. Partial TOA, using the time difference at two spaced receive locations produces lines of position. The time difference loci for constant differences are hyperbolas with the receive locations forming foci. The eccentricity, e, of these hyperbolas varies from one to infinity and is a function of the value of t or the time difference. Referring to FIG. 9, two receive stations ADF #1 and ADF #2 are illustrated along with the base line E therebetween, which also corresponds to the ADF loci of least accuracy. Shown dotted is the loci of greatest accuracy (LGA-1,2). Superimposed are also a number of lines of position (LP) identified by their relative time difference. That is, for example, LP0 identifies the line of position on which a transmitter lies when its transmissions are received simultaneously at the two receive stations. Similarly, LP4 indicates the line of position on which a transmitter lies when the reception at one station is four microseconds ahead of the reception at the other station. In like fashion, LP-6 identifies the line of position on which a transmitter lies when its reception at ADF #1 leads its reception at ADF #2 by six microseconds.

Numerically, we can write that:

$$e = D/(\Delta t * 300),$$

where $\Delta t$ equals the time difference in microseconds, and

D equals separation of the receive station in meters. Table 1, reproduced below, tabulates several values of t and a resulting value of e for a separation between the receive stations of 4000 meters. A time difference of one microsecond represents a 150-meter space along the base line E.

TABLE I

| (2*CF) D (m) | $\Delta t$ (μs) | e | (CA) a (m) | b |
|---|---|---|---|---|
| 4000 | 0.2 | 66.67 | 30 | 1999.77 |
| 4000 | 0.4 | 33.33 | 60 | 1999.10 |
| 4000 | 0.6 | 22.22 | 90 | 1997.97 |
| 4000 | 0.8 | 16.67 | 120 | 1996.40 |
| 4000 | 1.0 | 13.33 | 150 | 1994.37 |
| 4000 | 2.0 | 6.67 | 300 | 1977.37 |
| 4000 | 3.0 | 4.44 | 450 | 1948.72 |
| 4000 | 4.0 | 3.33 | 600 | 1907.88 |
| 4000 | 5.0 | 2.67 | 750 | 1854.05 |
| 4000 | 6.0 | 2.22 | 900 | 1786.06 |
| 4000 | 7.0 | 1.90 | 1050 | 1702.20 |
| 4000 | 8.0 | 1.67 | 1200 | 1600.00 |
| 4000 | 9.0 | 1.48 | 1350 | 1475.64 |
| 4000 | 10.0 | 1.33 | 1500 | 1322.88 |
| 4000 | 11.0 | 1.21 | 1650 | 1130.27 |
| 4000 | 12.0 | 1.11 | 1800 | 871.78 |
| 4000 | 13.0 | 1.03 | 1950 | 444.41 |

$$CA = \frac{\Delta t(3 \times 10^2)}{2} \quad (1)$$

$$e = CF/CA \quad (2)$$

$$b^2 = a^2(e^2 - 1) \quad (3)$$

Combining the TOA data and the voice frequency (VF) ADF information or TCAS ADF, reveals the following. The ADF information is most accurate around the loci of greatest accuracy and, in addition, locates accurately transverse to the direction of the loci of least accuracy (E). However, locating, at these same stations, receivers to receive TCAS squitter transmission achieves best accuracy along the loci of least accuracy E (and good accuracy in the region along the loci of greatest accuracy). As a result, just two receiving stations provide very good position location accuracy over the entire circular area between two stations. An inherent advantage of combining VF or TCAS ADF and differential TOA is a degree of redundancy that allows accuracy improvement by statistical processing and provides a higher level of system reliability. Either station alone can provide bearing information, two stations provide location and a third station provides redundancy against equipment failure, complementary error reduction and improvement in location accuracy via statistical techniques.

In terms of accuracy, drifts on the order of $10^{-7}$ per second produce time measurement errors on the order of 0.1 microseconds. This is well within low cost crystal oscillator technology. State of the art for crystal sources is approximately $10^{-9}$ per day and $10^{-11}$ per second. By calibrating our time base every 100 seconds, and using an accuracy of $10^{-7}$ per $10^2$ seconds or $10^{-9}$ per second, we achieve the desired goal. To measure differential TOA, the received signal is recorded along with clock value at the station at which it is received; the clock values are compared to the clock log updated every minute or so and through a comparison between the clock value recorded at ADF #1 and ADF #2, the difference is measured to 0.1 microseconds. One of the functions of the microprocessor 130 is to maintain the clock log.

Figure 10:
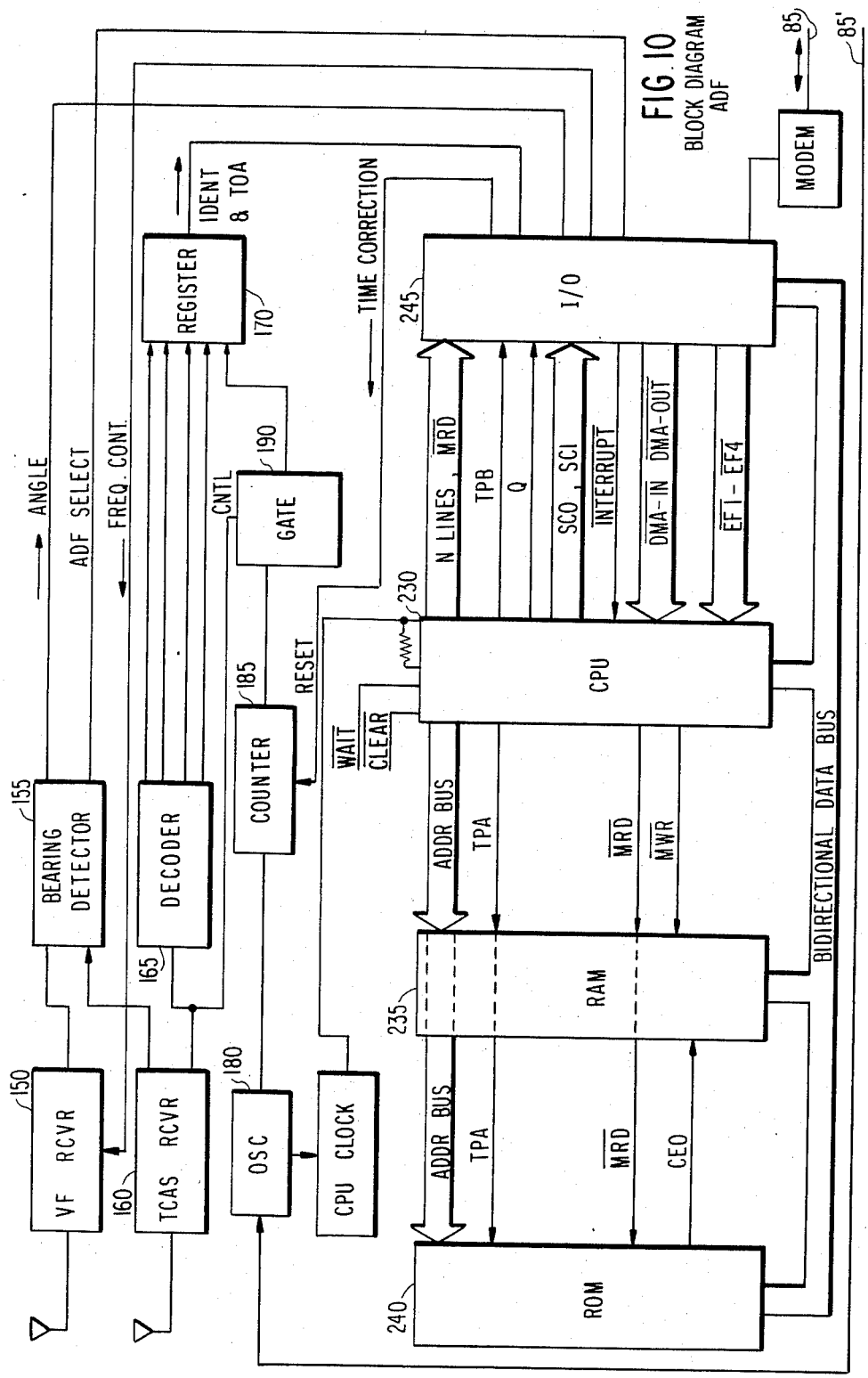
FIG. 10 is a block diagram of equipment located at a receive station for monitoring both VF and TCAS transmissions.

FIG. 10 is one example of the equipment located at each receive station (formerly referred to as an ADF station). This includes a VF receiver 150 coupled to an antenna at its input, and a bearing detector 155 determining, from a received VF transmission, bearing information. This bearing angle is coupled through I/O port 245 for storage and output to communication channel 85 via a modem 147. For those embodiments of the invention which do not rely on TCAS transmission, this plus the microprocessor 230, 235, 240 are the only equipment required at a receive station.

The microprocessor includes an I/O port 245, CPU 230, read/write memory 235 and read only memory 240. For the embodiment of the receive station shown in FIG. 10, the bearing detector 155 provides angle information which may be digitized by the CPU 230 through the I/O port 245. The resulting digital angle data is coupled again through the modem 147 on the communication link 85 to ADF processor 75.

The VF receiver 150 can be tuned either to approach control or ground control frequencies, again controlled via the microprocessor. However, for those stations which rely on TCAS transmissions, the receiver stations include the remaining apparatus shown in FIG. 10. This includes a TCAS receiver 160 coupled to an antenna at its input. One output of the TCAS receiver is coupled to a decoder 165. The decoder output is coupled to a register 170 wherein the received signal, after decoding, is stored. In order to provide TOA information, the station also includes an oscillator 180 with an output clock counter 185. Another output from TCAS receiver 160 is coupled to bearing detection 155 which under CPU control can provide bearing information on TCAS via ADF Select line. Another output of the TCAS receiver 160 is coupled as the control input to a gate 190 which, when enabled, couples the status of the counter 185 to the register 170. Accordingly, information respecting TOA as well as the received data can be coupled from the register 170 to the I/O port 245. To maintain accuracy of the clock log, the counter 185 is periodically reset from the processor 130. This reset signal is coupled from the I/O port 145 to the reset input of the counter 185.

Figure 11:
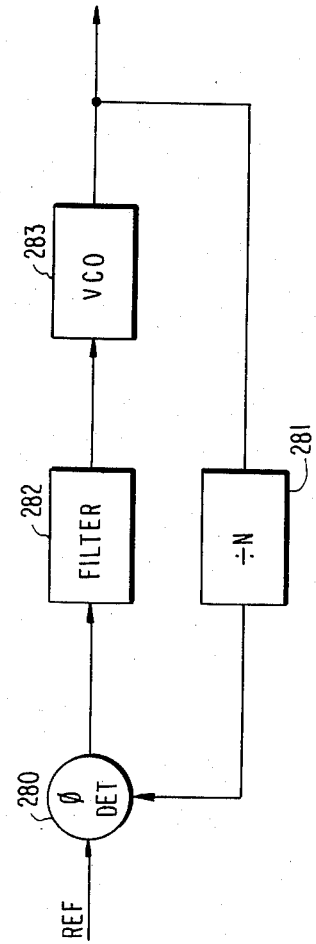
FIG. 11 is a block diagram of a preferred embodiment for the oscillator 180 of FIG. 10.

While the oscillator 180 (of FIG. 10) could be independent, this raises the possibility that the time base at the different receive stations can vary, introducing errors into the time difference measurement. To eliminate this variation, the oscillator 180 at each receive station takes the form shown in FIG. 11, which is a basic divide-by-n phase lock loop. More particularly, a phase detector 280 is subject to two inputs, a reference input and an input from a divide-by-N counter 281. The output of the phase detector drives a VCO 283 through a loop filter 282. The output of the VCO 283 is the output of the oscillator 180 and is also the input to the divide-by-N counter 281. The reference input to the phase detector 280 is coupled over a communication link 85' from the central site (or the location of the ADF processor 75). Since the reference frequency at each of the receive stations is transmitted from the central site, they are all identical. The value of N is chosen so that the reference frequency is compatible with telephone line transmissions, i.e. for example 2500 hertz. Once the phase lock loops at the receive stations lock up, the output of the oscillator 180 at all ADF sites will have exactly the same frequency. The counter 185 functions to adjust the phase as determined by the ADF processor (FIG. 8).

I claim:

1. An aircraft locating system identifying, on a TV format radar display, position of a specific aircraft based on an RF transmission from said aircraft on an RF channel comprising:

at least a pair of receive stations located within several miles of an airport and separated by a base line which is in near proximity to at least one runway at said airport or a theoretical extension thereof, each said receive station comprising passive receiver means for determining a bearing angle to a source of RF on said RF channel and for generating a signal representative of said bearing angle, processing means responsive to said signals representative of bearing angle from said receive stations for generating line count and line delay data correlating a position determined by bearing angle signals from at least said pair of receive stations with a frame of reference of said TV display, video mixer means responsive to a scan converted radar return signal and said line count and line delay data for producting a combined video signal with the ability to highlight a location identified by said line count and line delay data.

2. The apparatus of claim 1 wherein each said passive receiver means of each said receive station is tuned to an approach control frequency.

3. The appartus of claim 1 wherein each said passive receiver means at each said receive station is tuned to a ground control frequency.

4. The apparatus of claim 1 wherein each said passive receiver means is tunable between approach control frequency and ground control frequency, and means for controlling said passive receiver means to tune to approach control frequency or ground control frequency.

5. The apparatus of claim 1 which includes at least three receive stations, wherein said processing means includes:

position determining means responsive to bearing angle representing signals from each pair of said receive stations for determining line count and line delay data for each of said pair of said receive stations, and to thereby generate line count and line delay data for each transmitting aircraft for each said pair of receiver stations, combining means for statistically combining all line count and line delay data for each transmitting aircraft.

6. The apparatus of claim 1 which further includes, at each of said receive stations, a TCAS receiver and time base means for maintaining a time base, means at each station to record a received TCAS signal from TCAS equipped aircraft, as well as a state of said time base, at the time said TCAS signal is received, means for transmitting information recorded at said station to said processing means, said processing means including means for identifying a hyperbolic location line corresponding to a position of said aircraft based on said recorded information.

7. The apparatus of claim 1 in which said receive station includes:

a first receiver, comprising said passive receiver means, tuned to an RF voice frequency corresponding to an aircraft carried VF transmitter, and a second receiver tuned to a RF TCAS frequency corresponding to an aircraft carried TCAS transmitter, recording means responsive to said second receiver for capturing TCAS transmissions and time of arrival of said TCAS transmission, and means coupling signals from said recording means and signals representative of said bearing angle to said processing means, said processing means further including:

means responsive to said signals from said recording means for generating a hyperbolic line of position along which is a transmitting aircraft, and combining means for determining said line count and line delay data from pairs of said bearing angle signals and said hyperbolic line of position.

8. A receive station useful in generating an enhanced ASR display comprising:

a VF receiver tuned to an approach or ground control frequency, bearing means responsive to said VF receiver for determining a bearing angle from an aircraft transmitting on said approach or ground control frequency to said station, a TCAS receiver coupled to a TCAS decoder, a register, time base means for maintaining a time base, a gate with an input from said time base means, said gate with an output coupled to said register, and said gate with a control input from said TCAS receiver, means connecting an output of said TCAS decoder to said register, and control means for sampling and transmitting outputs of said bearing means and said register.

9. The station of claim 8 in which said VF receiver is tunable to either said approach or ground control frequency and in which said control means tunes said VF receiver.

10. The station of claim 8 in which said bearing means is responsive to said TCAS receiver for determining a bearing angle from an aircraft transmitting a TCAS signal to said station and said control means controls said bearing means to respond to either said TCAS receiver or said VF receiver.

11. The system of claim 1 wherein said RF channel is used for an additional function not associated with said system.

12. The system of claim 5 wherein said RF channel is used for an additional function not associated with said system.

13. The system of claim 6 wherein said RF channel is used for an additional function not associated with said system.

14. The system of claim 7 wherein said RF channel is used for an additional function not associated with said system.

* * * * *